US011952066B2

(12) United States Patent
Ycas

(10) Patent No.: US 11,952,066 B2
(45) Date of Patent: Apr. 9, 2024

(54) MAGNETIC BOTTLE HOLDER

(71) Applicant: Trevor Warren Ycas, Boulder, CO (US)

(72) Inventor: Trevor Warren Ycas, Boulder, CO (US)

(73) Assignee: Trevor Ycas, Boulder, CO (US)

( * ) Notice: Subject to any disclaimer, the term of this patent is extended or adjusted under 35 U.S.C. 154(b) by 72 days.

(21) Appl. No.: 17/942,891

(22) Filed: Sep. 12, 2022

(65) Prior Publication Data

US 2023/0084084 A1     Mar. 16, 2023

Related U.S. Application Data

(60) Provisional application No. 63/244,300, filed on Sep. 15, 2021.

(51) Int. Cl.
*B62J 11/04*     (2020.01)

(52) U.S. Cl.
CPC ................... *B62J 11/04* (2020.02)

(58) Field of Classification Search
CPC ........... B62J 11/00; B62J 11/04; F16M 11/04; F16M 11/041; F16M 13/02; A47G 23/02
See application file for complete search history.

(56) References Cited

U.S. PATENT DOCUMENTS

| | | | | |
|---|---|---|---|---|
| 4,570,835 A | * | 2/1986 | Criqui | B62J 11/04 |
| | | | | 224/446 |
| 5,170,981 A | * | 12/1992 | Lin | B62J 9/27 |
| | | | | 248/311.2 |
| 6,059,245 A | * | 5/2000 | Hermansen | B62J 11/04 |
| | | | | 248/316.5 |
| 8,353,544 B2 | | 1/2013 | Fiedler | |
| 8,430,434 B2 | | 4/2013 | Fiedler | |
| 8,800,117 B2 | | 8/2014 | Fiedler | |
| 9,758,080 B2 | | 9/2017 | Goldman | |
| 10,703,429 B2 | * | 7/2020 | Fiedler | B62J 11/04 |
| 11,505,269 B2 | * | 11/2022 | Farrell | B62J 11/04 |
| 11,772,734 B2 | * | 10/2023 | Farrell | B62J 11/04 |
| | | | | 224/414 |
| 2004/0173719 A1 | | 9/2004 | Mitchel | |
| 2011/0042435 A1 | * | 2/2011 | Weng | B62J 11/04 |
| | | | | 224/412 |
| 2011/0147424 A1 | * | 6/2011 | Brown | B62J 11/04 |
| | | | | 224/567 |
| 2013/0181015 A1 | * | 7/2013 | Cason | B62J 11/04 |
| | | | | 222/78 |
| 2021/0361101 A1 | * | 11/2021 | Hsu Besner | A47G 23/0225 |
| 2022/0048586 A1 | * | 2/2022 | Trif | B62J 6/16 |

* cited by examiner

*Primary Examiner* — Monica E Millner
(74) *Attorney, Agent, or Firm* — Russell Manning; FisherBroyles, LLP

(57) ABSTRACT

A magnetic bottle holder for use in cycling and other applications. The magnetic bottle holder is cageless allowing a user to disengage and engage a standard water bottle in a 'blind' operation from multiple angles and directions.

19 Claims, 11 Drawing Sheets

MAGNETIC BOTTLE HOLDER

CROSS-REFERENCE

The present application claims the benefit of the filing date of U.S. Provisional Application No. 63/244,300 having a filing date of Sep. 15, 2021, the entire contents of which is incorporated herein by reference.

FIELD

The present disclosure relates to a magnetic holder. More specifically, the present disclosure is directed to a magnetic bottle holder primarily for cycling applications.

BACKGROUND

Many bicycles include a water bottle mount affixed to the bicycle frame. Such water bottle mounts typically include a partially enclosed cage that receives and surrounds a water bottle. The cage is often mounted to the down tube of the frame and directly below the top tube or crossbar of the frame. A water bottle secured in the cage is withdrawn axially from an open upper end of the cage and inserted in a reverse manner. The process of removing and the water bottle can be distracting for a cyclist. That is, a cyclist may take their eyes from the road or other surroundings while looking at the water bottle during its retrieval and/or replacement.

BRIEF SUMMARY OF THE DISCLOSURE

The present inventor has recognized that a cage free bottle holder would allow a cyclist to remove and replace a water bottle while cycling free of distraction. Along these lines, provided herein is a magnetic bottle holder for use in cycling and other applications. The magnetic bottle holder is cageless allowing a user to disengage and engage a standard water bottle in a 'blind' operation from multiple angles and directions.

The foregoing and other aspects, features, details, utilities, and advantages of the present disclosure will be apparent from reading the following description and claims, and from reviewing the accompanying drawings.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by particular application(s) or use(s) of the presented inventions.

Figure 1:
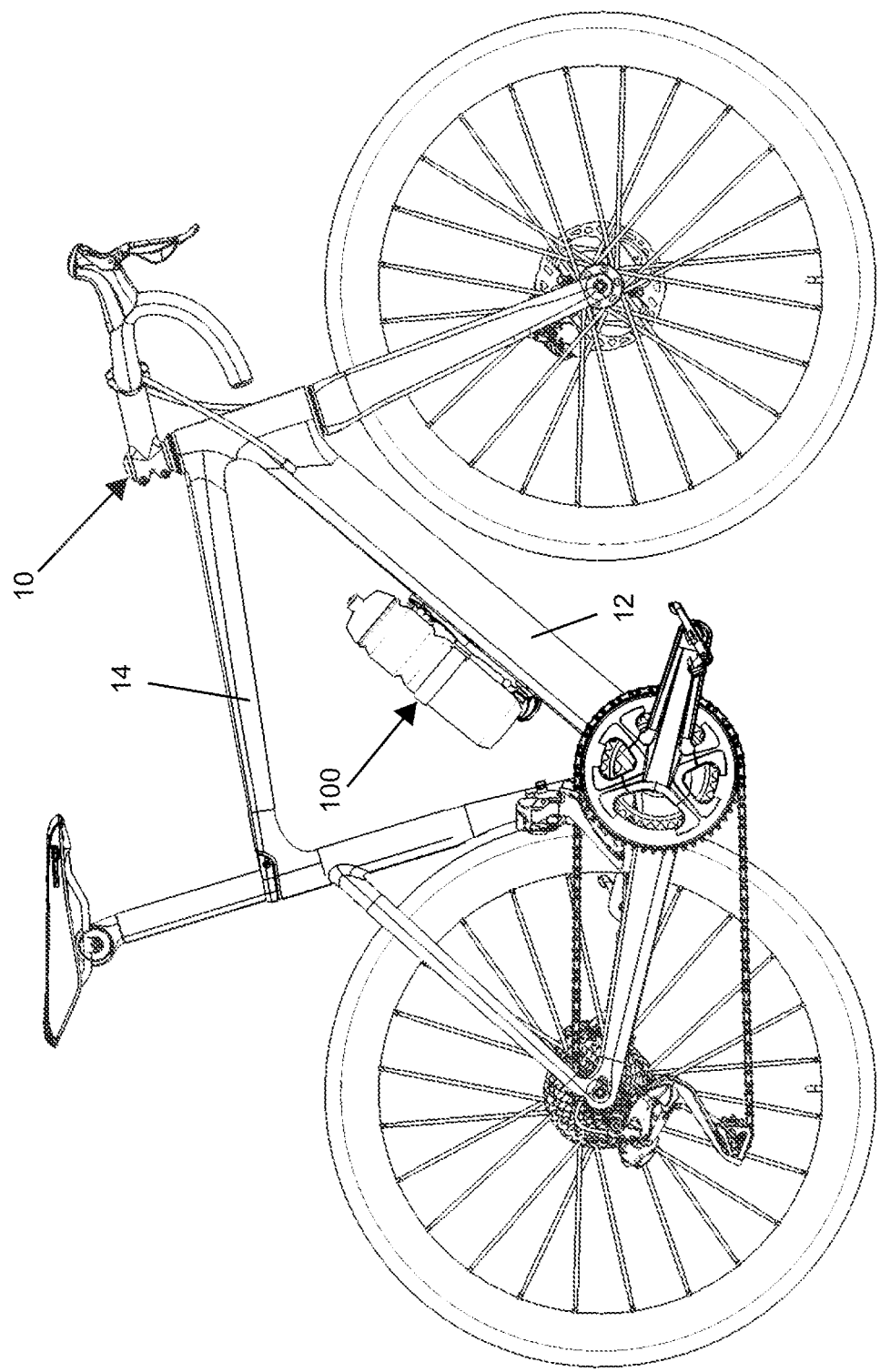
FIG. 1 illustrates a bicycle with a magnetic bottle holder, in an embodiment.

FIG. 1 illustrates a bicycle 10 incorporating a magnetic bottle holder 100 in accordance with the present disclosure. As illustrated, the magnetic bottle holder 100 is shown mounted to the frame of the bicycle. More specifically, the bottle holder 100 is mounted or otherwise attached to the bicycle frame downtube 12 and below the bicycle frame top tube 14. As noted above, accessing a water bottle attached to the downtube 12 and directly beneath the top tube or cross bar can provide challenges if a water bottle is engaged within a cage type bottle holder. Specifically, bicyclists may take their eyes off the road while looking at the water bottle during its removal and/or replacement.

To provide a water bottle holder that allows blind operation and ease of replacement of the bottle from any angle or direction, the present disclosure is directed to a water bottle assembly that utilizes a magnetic connection. Unlike prior attempts to produce a magnetic water bottle holder, which have required specialized bottles having magnets attached within or on their surfaces, the presented bottle holder assembly may be utilized with standard water bottles allowing users to readily replace their water bottles.

Figure 2A:
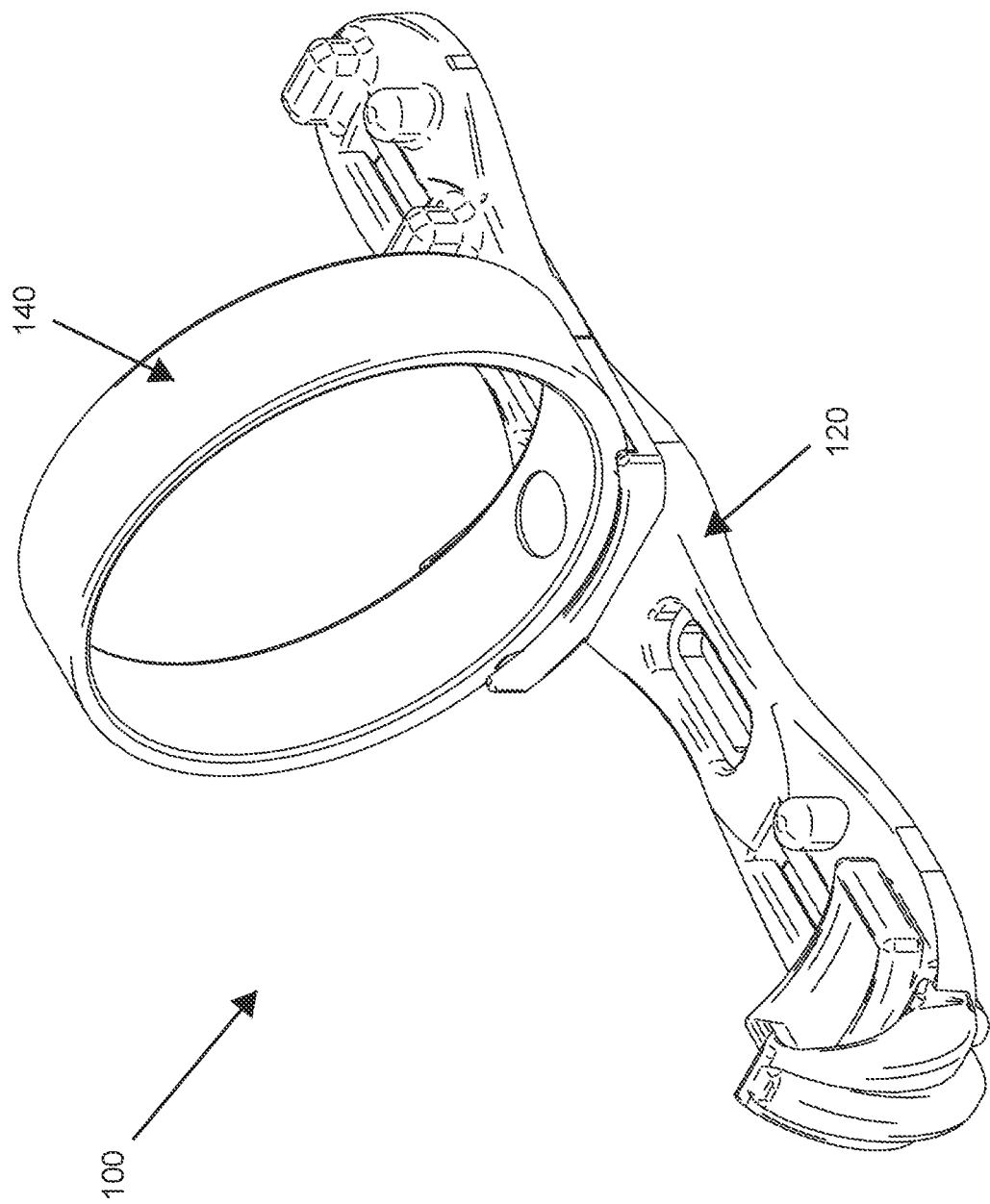
FIG. 2A shows a rear perspective view of a magnetic bottle holder, in an embodiment.
Figure 2B:
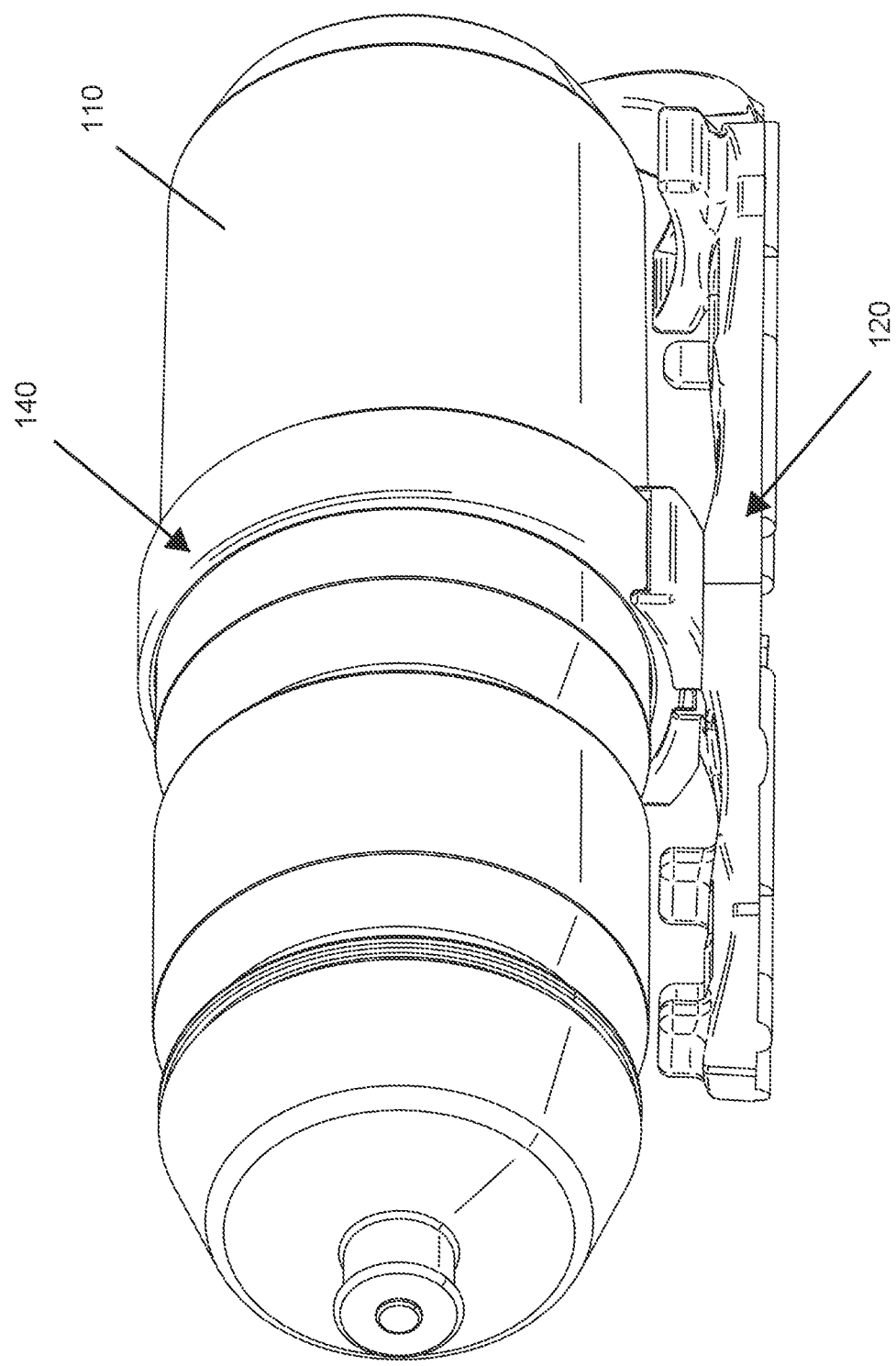
FIG. 2B shows a front perspective view of a magnetic bottle holder, in an embodiment.
Figure 2C:
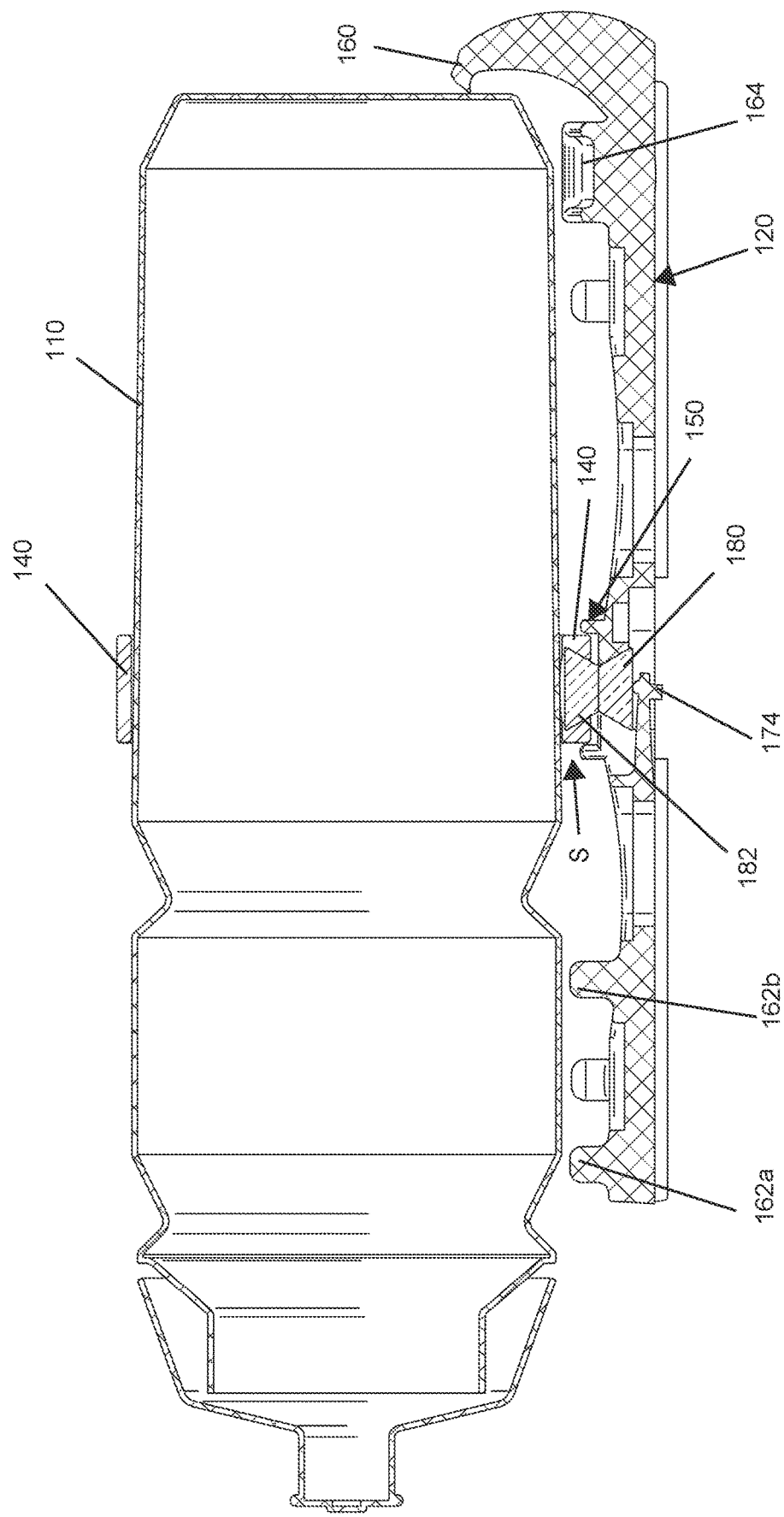
FIG. 2C shows a cross-sectional view of a magnetic bottle holder, in an embodiment.

FIGS. 2A, 2B and 2C illustrate one embodiment of the bottle holder assembly 100. More specifically FIG. 2A illustrates a rear perspective view of the bottle holder assembly 100 without a water bottle. As illustrated, the bottle holder assembly incudes a retaining ring 140 magnetically attached to a frame or body 120 of the bottle holder assembly 100. As discussed herein, a bottle may be disposed within the interior of the retaining ring 140 such that the bottle and retaining ring 140 may be engaged and disengaged with the assembly frame 120. FIG. 2B illustrates front perspective view of the bottle holder assembly 100 with a water bottle 110 disposed within the retaining ring 140, while the retaining ring 140 is magnetically connected to the assembly frame 120. FIG. 2C illustrates a side cross-sectional view of the water bottle assembly while the retaining ring 140 removably affixes the water bottle to the frame. The water bottle assembly 100 includes two primary components, the body/frame 120 and the retaining ring 140. The bottle may be any water bottle.

Figure 3A:
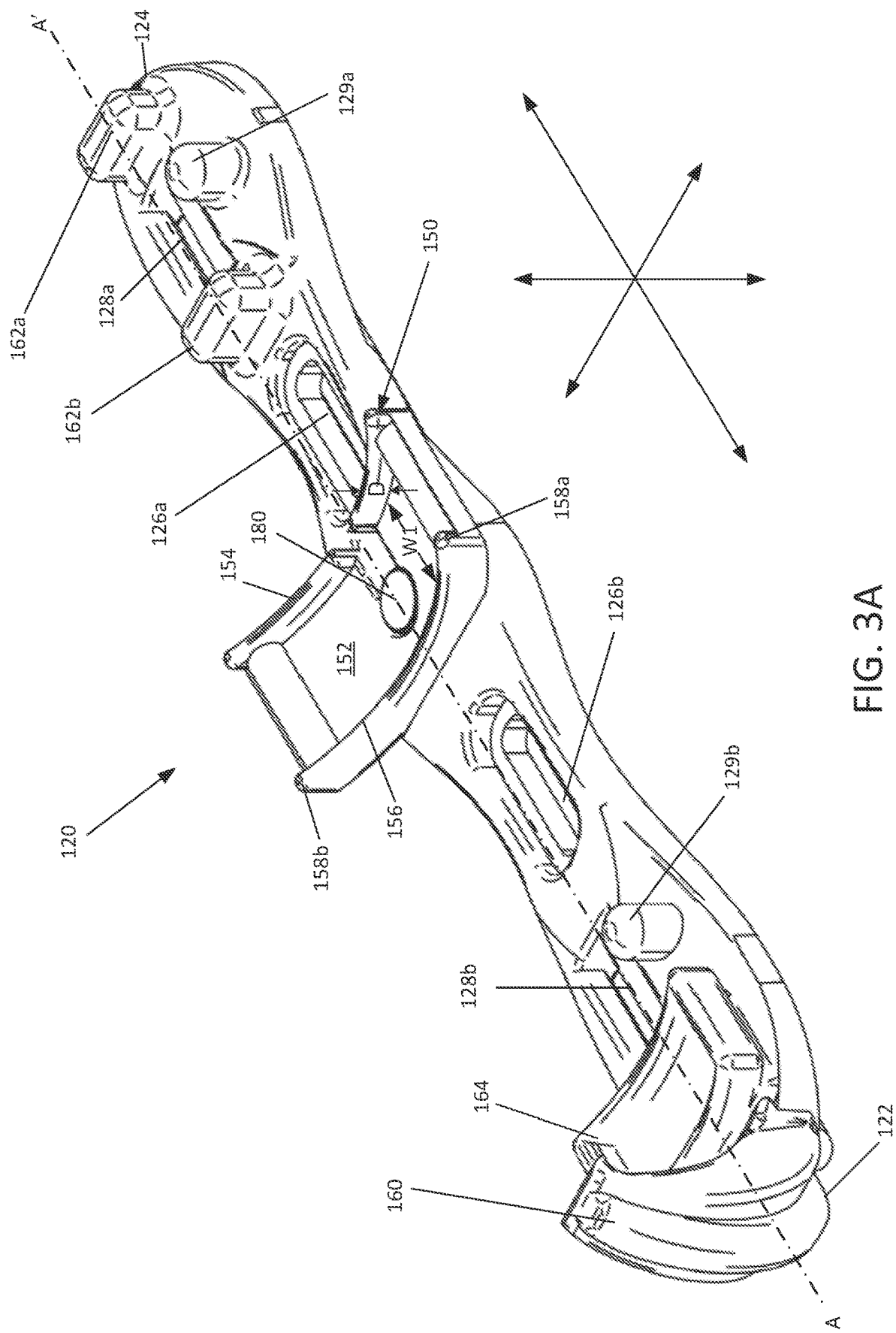
FIG. 3A shows a top perspective view of a frame of the magnetic bottle holder, in an embodiment.
Figure 3B:
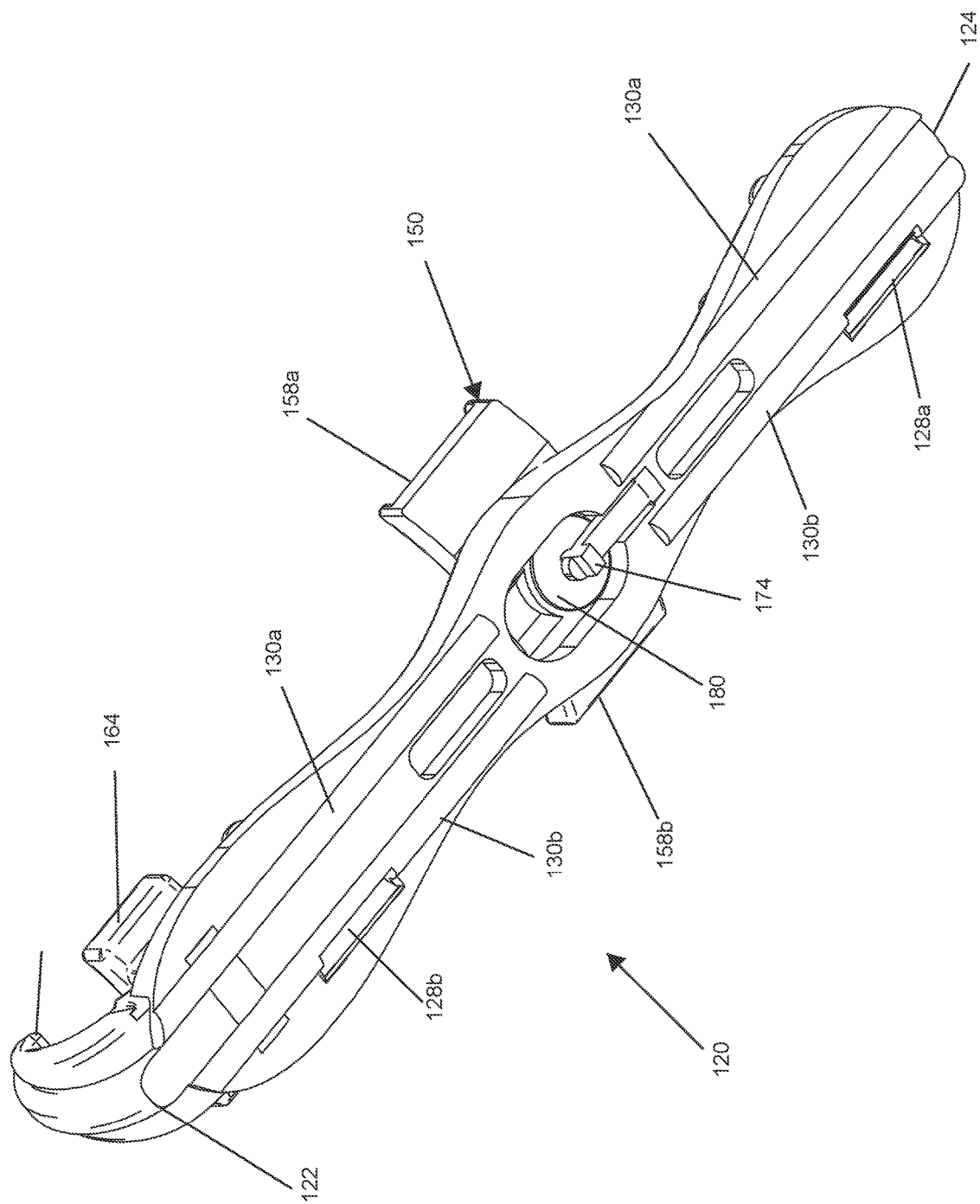
FIG. 3B shows a bottom perspective view of a frame of the magnetic bottle holder, in an embodiment.

FIGS. 3A and 3B illustrate top and bottom perspective views, respectively, of the assembly frame 120. As illustrated, the frame 120 is a generally elongated body that extends from a rearward end 122 to a forward end 124. Generally, the length of the body between the rearward end 122 and the forward end 124 defines a long axis A-A' of the frame 120. The frame 120 is configured for attachment to a frame or tube of a bicycle as illustrated in FIG. 1. Referring again to FIGS. 3A and 3B, the exemplary frame 120 includes first and second means for attachment to the frame of a bicycle. The first means for attaching the assembly frame 120 to a tube of the bicycle includes first and second apertures 126a and 126b (hereafter 126 unless specifically referenced). These apertures 126 are spaced along the length of the frame 120 and allow for connection to threaded apertures found in the lower tube of many bicycles. This connection is further illustrated and discussed in relation to FIG. 8A discussed below. The second means for attaching the assembly frame 122 a tube of a bicycle includes first and second strap apertures 128a, 128b located proximate to the forward and rearward ends of the frame. Straps may pass through these apertures 128a, 128b, extend around the frame of a bicycle and engage corresponding studs 129a, 129b on the upper surface of the assembly frame 120. Typically, the straps extending through the strap apertures 128a, 120b are elastic to allow for securing/cinching the straps around the bicycle tube securing the assembly frame 120 to the bicycle. This is further illustrated and discussed in relation to FIGS. 6, 7 and 8B discussed below.

As best illustrated in FIG. 3B, the bottom surface of the frame 120 includes first and second rails 130a, 130b (hereafter 130 unless specifically referenced) that extend generally along the length of the frame 120. These rails 130 are spaced and generally parallel to allow the frame 120 to mate with the generally rounded tube of a bicycle. That is, the bottom surface of the frame is recessed between the rails 130. However, it will be appreciated these rails 130 are optional and other means for conforming the bottom surface of the assembly frame 120 to a bicycle tube may be utilized such as, for example, compressible foams etc.

Located along the length of an upper surface of the frame 120 between the rearward and forward end is a docking mount 150. The docking mount 150 generally defines recessed channel 152 that is substantially transverse to the long axis A-A' of the frame 120. As illustrated in FIGS. 2A-2C, this channel 152 is sized to receive the retaining ring 140. Referring again to FIGS. 3A and 3B, the channel 152 has a forward wall 154 and rearward wall 156 that are spaced apart a first width 'W1', which is slightly greater than a second width 'W2' of the retaining ring. See Also FIG. 4B. Accordingly, the retaining ring 140 may be disposed between the forward and rearward walls 154, 156 of the channel 152 while an outside surface of the retaining ring 140 is disposed proximate to the bottom of the recessed channel 152. A magnet 180 disposed in the bottom surface of the channel 152 magnetically engages a magnet 182 incorporated into a sidewall of the retaining ring 140. This is best illustrated in FIG. 2C. As illustrated in the various figures, each of these walls 154, 156 extends from a bottom edge at a bottom surface of the channel to a top edge. The distance between the bottom edge of channel walls 154, 156 and the top edge of the channel walls 154, 156 defines a depth 'D' of the recessed channel and/or a height of the walls. See FIG. 3A. As is further discussed below, the channel may be arcuate. When arcuate, the channel may vary in depth along its length.

As illustrated, the recessed channel 152 and docking mount 150. extend laterally across the frame 120 of the assembly relative to the long axis A-A' of the frame 120. To provide side-to side stability to a water bottle secured to the frame 120 by a retaining ring 140, the width of the docking mount 150 is typically wider than the width of the elongated body/frame 120 such that opposing ends of the docking mount 150 extend laterally outward from the body 120. Stated otherwise the docking mount 150 has first and second wings 158a, 158b (hereafter 158 unless specifically referenced) that extend outward relative to the long axis of the frame 120. The channel 152 extends across the width of the docking mount 150 from opposing outer edges of these wings 158. The width of the docking mount 150 as measured from the outside edges of the wings may be selected to provide stability to a water bottle 110 disposed within the retaining ring 140 as discussed below.

The rearward end of the frame 120 further includes a tailhook 160 that extends above a top surface of the frame 120. The tail hook is configured to engage a lower end of a water bottle 110 when the bottle 110 is disposed within the retaining ring 140 and the retaining ring 140 is disposed within the recessed channel 152 of the docking mount 150 (e.g., the magnet 180 in the recessed channel 150 is magnetically connected to the magnet 182 in the retaining ring 140). The frame assembly magnet 180 may be affixed within the recessed channel 152 in any appropriate manner. In the illustrated embodiment, the frame assembly magnet 180 is held proximate to the bottom surface of the recessed channel via a cantilevered spring tab 174.

Figure 4C:
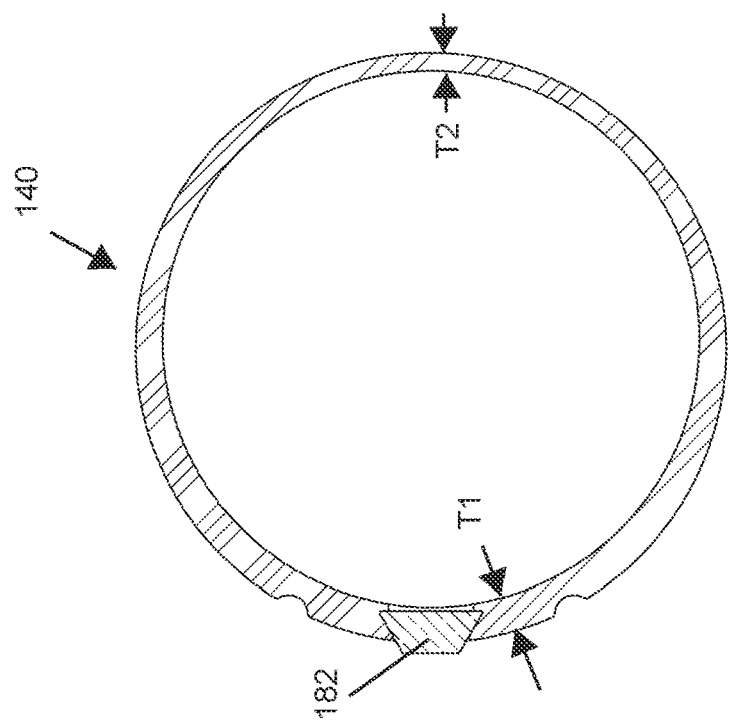
FIGS. 4A, 4B and 4C illustrate perspective, side and cross-sectional views, respectively, of a magnetic retaining ring, in an embodiment.
Figure 4B:
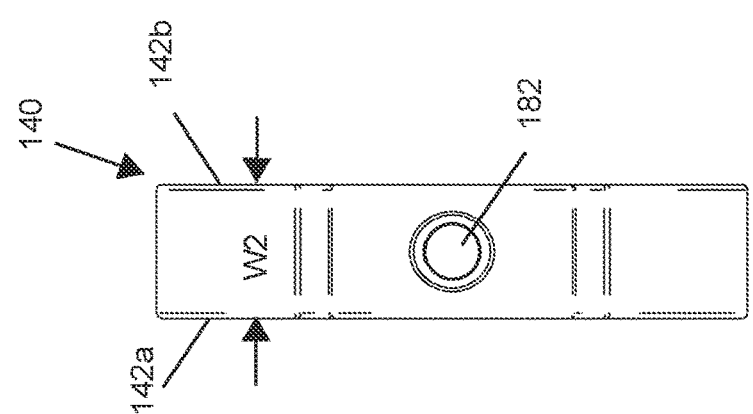
Figure 4A:
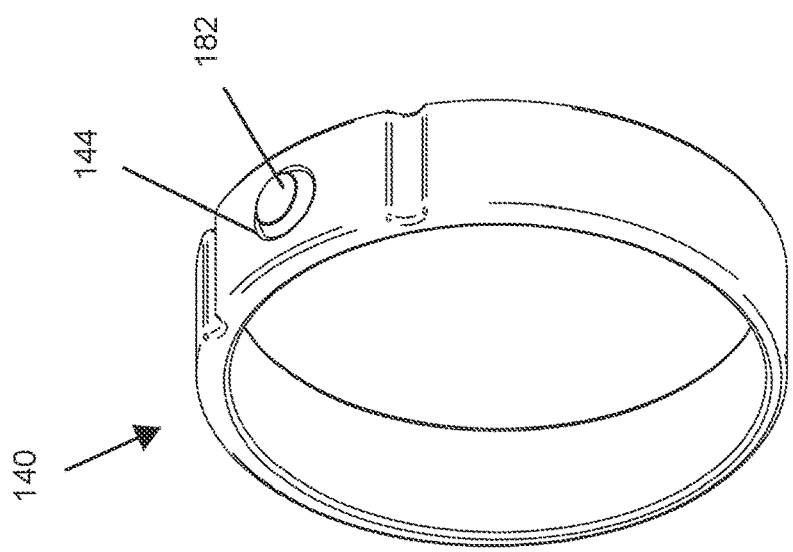

FIGS. 4A, 4B and 4C illustrate perspective, side and cross-sectional views of the retaining ring 140. As shown the retaining ring 140 is a generally cylindrical element extending from a first edge 142a to a second edge 140b. The distance between the edges defines width W2 (e.g., second width) of the retaining ring 140. The width W2 of the retaining ring 140 is slightly smaller than the width W1 of the recessed channel 152 allowing a portion of a sidewall of the ring 140 to be disposed within the recessed channel. In the illustrated embodiment, the ring has an aperture 144 formed within its sidewall. The aperture houses a magnet 182. In an embodiment, aperture has sloped sidewall allowing a trapezoidal or frustoconical magnet 182 extend from an inside surface of the ring outward. The magnet 182 may be trapped in the aperture 144 between a bottle 110 and the smaller outer opening of the aperture 144. See also, FIG. 2C. That is, tapered sidewalls of the magnet 182 and aperture 144 prevent the magnet from passing through the sidewall of the retaining ring 140. Other means of connecting the magnet to the sidewall are possible and within the scope of the present disclosure. However, in most embodiments, the magnet will be at least partially disposed in the sidewall of the retaining ring.

The retaining ring 140 has a hollow interior (e.g., inside diameter) that is sized to extend around an outside surface of a generally cylindrical bottle. Typically, the retaining ring 140 is formed of a resilient or elastic material such as a thermoplastic elastomer (TPE) such as thermoplastic polyurethane (TPU), or ethylene propylene diene monomer (EPDM) Rubber. Other materials are possible. Due to the elasticity of the retaining ring 140, an inside diameter of the ring may be slightly less than an outside diameter of a standard water bottle. Accordingly, the ring 140 may be stretched over the water bottle and positioned along the side wall of the water bottle at a desired location. Typically, the ring will be located along the length of the bottle at a location that allows the ring to be positioned within the channel of the docking mount while the rearward end of the bottle engages the tail hook. The smaller inside diameter of the ring, in conjunction with tackiness of the ring material, generally allows the ring to maintain its location along the length of the bottle free of any adhesives or other connections. Further, the elasticity of the ring allows the ring to engage a wide variety of standard sport bottles (e.g., configured for use with existing cage-type bottle holders) of varying heights and/or with slightly varying diameters.

In one embodiment, the inside diameter of the ring 140 has a center that is offset from the outside diameter of the ring 140. This is best illustrated in FIG. 4C. As illustrated, the magnet aperture 144 extends through the thickest part of the ring 140 having a first thickness 'T1'. The opposing side of the ring 140 may have a second thickness 'T2' that is less than the T1. This varying of the thickness over the circumference of the ring 140 may allow for more readily stretching the elastic ring and positioning the ring along the side wall of the bottle. However, the use of a varying sidewall diameter is not required for all embodiments of the assembly.

The assembly frame 120, docking mount 150 and retaining ring 140 work collectively to counteract forces on a water bottle when the retaining ring attaches the bottle to the frame. As will be appreciated, when a water bottle is supported on a bicycle frame (See, e.g., FIG. 1), the bottle may experience forces along various axes as best illustrated in FIG. 3A. For instance, the bottle may experience sliding along the long axis of the bottle due to, for example, acceleration or deceleration. The bottle also may experience side-to-side motion as well as up-and-down motion. Stated otherwise, the bottle may experience motion along three principal axes and/or combinations of the same. In addition, the bottle may experience pitch, yaw, and roll forces about these three axes. By way of example the bottle may experience pitching motion due to the motion of the front wheel relative to the rear wheel in a vertical axis and may experience yawing due to side-to-side motion of the bicycle. Accordingly, the assembly frame 120, docking mount 150 and retaining ring 140 each have various design features that allow for counteracting various ones of these forces alone or in combination.

Initially, it is noted that the channel 152 in the docking mount 150 has a width W1 that is substantially similar though slightly larger than the width W2 of the retaining ring 140. When a sidewall portion of the retaining ring 140 is disposed within the channel 152 the forward and rearward walls 154, 156 of the channel 152 engage the forward and rearward edges of the ring 140 to counteract movement of the bottle along its long axis. Such isolation may be further assisted by the tail hook 160 which may engage the rearward end of the bottle. The tailhook may further assist in counteracting pitching forces. In a further embodiment, a forward end of the assembly frame 120 (e.g., in front of the docking mount 150) may have one or more landings 162a, 162b extending above the surface of the frame 120. See FIGS. 2C and 3A. These landings 162a, 162b may engage a sidewall surface of the bottle when the retaining ring 140 is engaged with the docking mount 150. Likewise, a rearward end of the frame may have one or more landings 164. Such landings may, along with the mounting dock and tailhook further counteract pitching forces.

Figure 5:
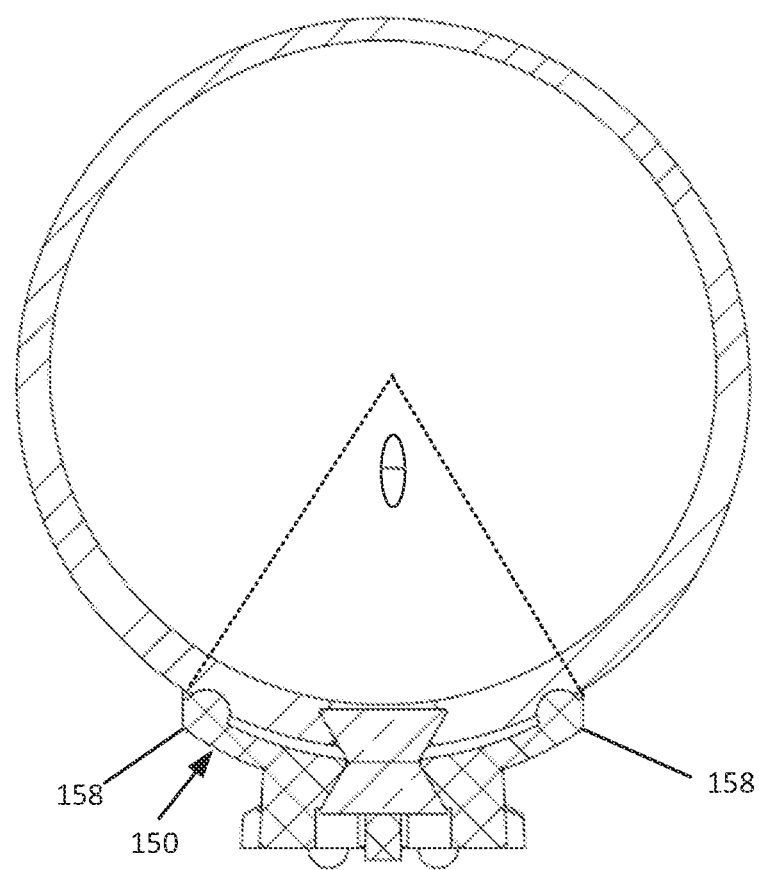
FIG. 5 illustrates an arc angle of a docking mount, in an embodiment.

To counteract the yawing motion of the bottle typically caused by side-to-side motion of the bicycle, the channel 152 of the docking mount is typically formed as an arcuate channel. The use of the arcuate channel 152 allows for receiving the generally cylindrical retaining ring therein and providing support at spaced locations around a portion of the circumference of the retaining ring. This is best illustrated in FIG. 5 which shows an end view of the assembly 100 from the forward end towards the rearward end while the retaining ring 140 is disposed within the docking mount 150. As shown, a portion of the sidewall of the generally cylindrical retaining ring 140 is disposed within the arcuate channel such that the magnet in the sidewall of retaining ring (not shown) engages the magnet in the bottom center of the arcuate channel (not shown). In such a configuration, the retaining ring 140 may be supported by the opposing ends of the first and second wings 158 of the docking mount 150. In this regard, a bottle disposed in the retaining ring (not shown) is supported at least two points around its circumference to help prevent disengagement of the bottle from the assembly frame 120 due to rolling/yawing motion.

As noted above, one feature of the magnetic bottle holder is its cageless design that allows a user to disengage and engage a standard water bottle in a 'blind' operation from multiple angles and directions. To allow for such blind operation, it has been found desirable that the assembly frame 120 and docking mount 150 provide minimal interference with the retaining ring and a bottle disposed within the retaining ring. Stated otherwise, it is preferable that by disposing the magnet 182 in the retaining ring 140 in proximity with the magnet 150 in the docking mount 150, the retaining ring is simply drawn into the channel. This operation is, in one embodiment, facilitated by eliminating contact between the docking mount 150 and the bottle 110 when the retaining ring is disposed in the recessed channel 152.

Referring again to FIGS. 2C, 3A, 4C, and 5, it is noted that the portion of the retaining ring 140 disposed within the recessed channel of the docking mount 150 has a thickness T1 (i.e., between an inside surface and an outside surface) that is greater that the depth D of the recessed channel 152. In this regard, an inside surface of the retaining ring is disposed above a top surface of the docking mount 150 along the length of the recessed channel. Accordingly, a bottle disposed within the retaining ring is suspended above the top surface of the docking mount and assembly frame. Stated otherwise, the bottle 110 is spaced a distance 'S" above the docking mount 150. See FIG. 2C. In this regard, the docking mount does not touch the sidewall of the bottle when the retaining ring is disposed within the recessed channel of the docking mount. Accordingly, the docking mount provides minimal or interference with the bottle when a user is attempting to engage the retaining ring with the docking mount.

To further reduce interference between the docking mount and a bottle disposed within a retaining ring, it has been determined it is desirable, in some embodiments, to reduce the arc length or arc measure of the recessed channel. That is, while a semi-circular docking mount (e.g., having a 180° arc measure) would be effective, use of such a docking mount could interfere with engaging the retaining ring with the docking mount. As illustrated in FIG. 5, the arc measure Θ of the recessed arcuate channel is taken from a center of the retaining ring 140 and the ends of the arcuate channel (e.g., opposing outside surfaces of the wings 158. It has been determined that an arc measure Θ of less that about 100 degrees and more than about 60 degrees, with a more preferred range of less than 90 degrees and more that 65 degrees, provides adequate support for counteracting yaw forces while minimizing interference of the docking mount with insertion and removal of a water bottle.

Figure 6:
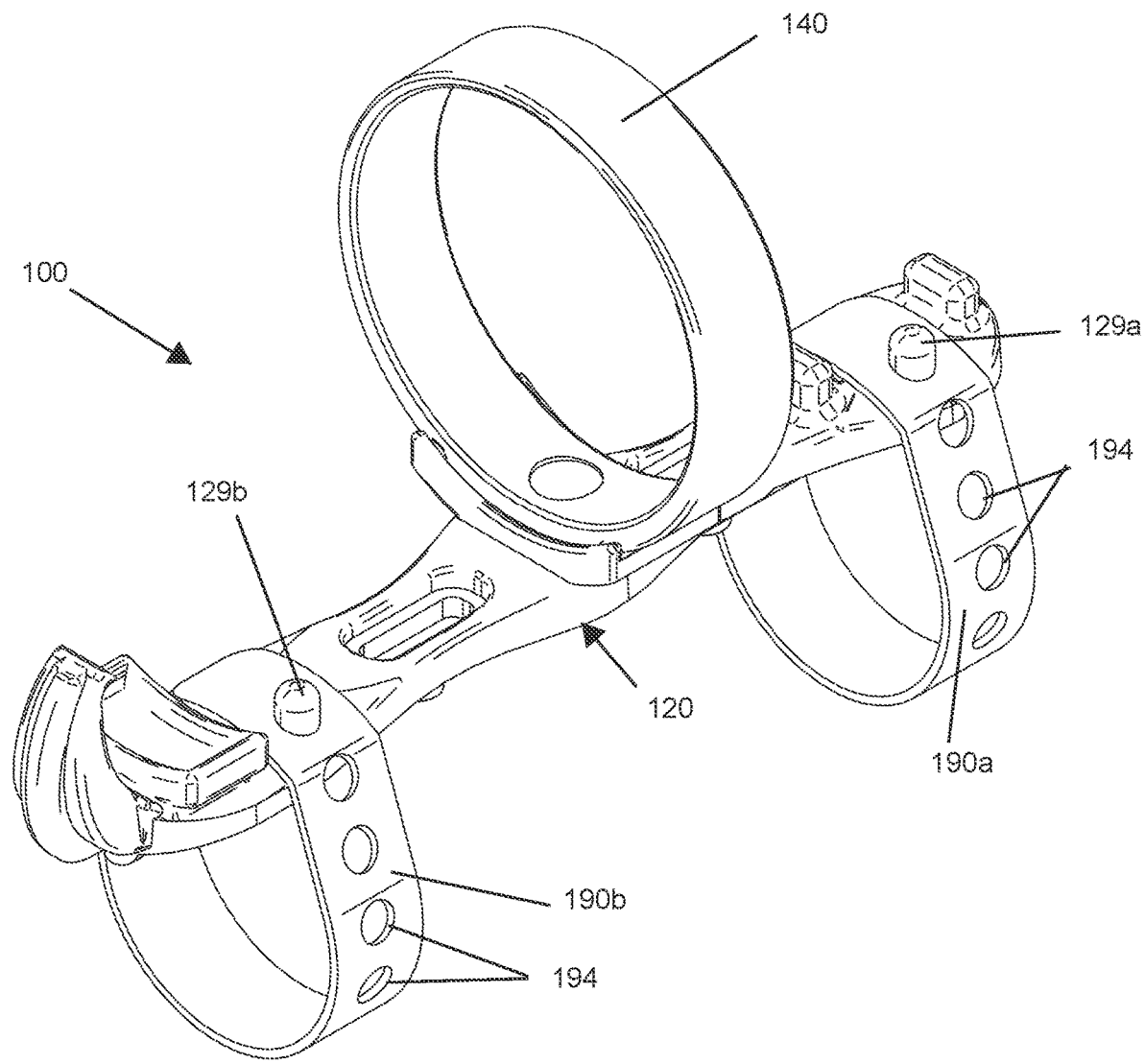
FIG. 6 illustrates a strap attachment means for the magnetic bottle holder, in an embodiment.
Figure 7:
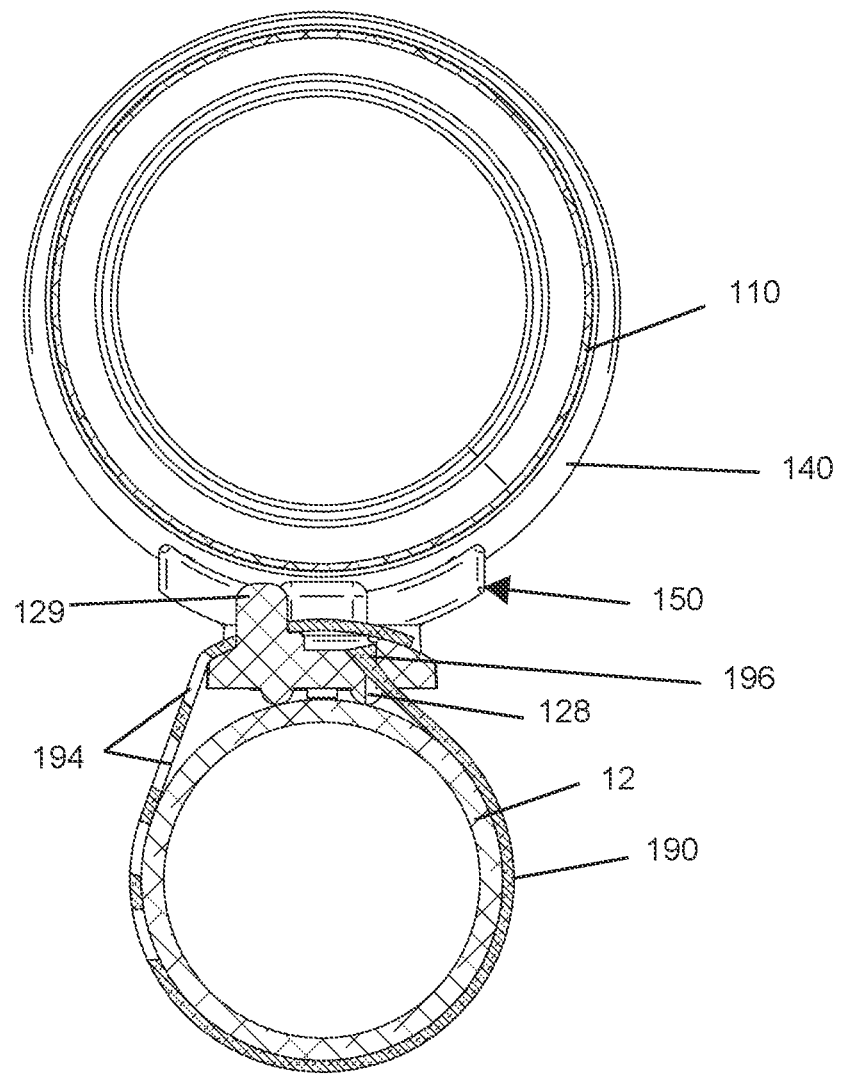
FIG. 7 illustrates a cross-sectional view of the strap attachment mean attaching the magnetic bottle holder to a tube of a bicycle frame, in an embodiment.
Figure 8A:
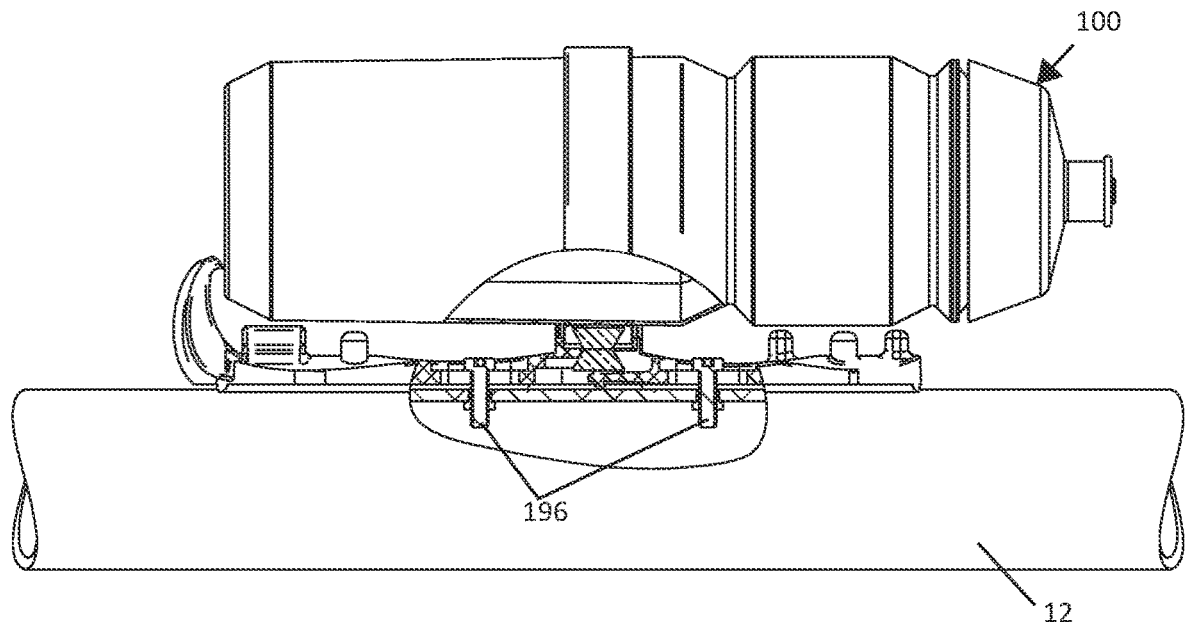
FIGS. 8A and 8B illustrate first and second connection of the magnetic bottle holder to a bicycle frame.
Figure 8B:
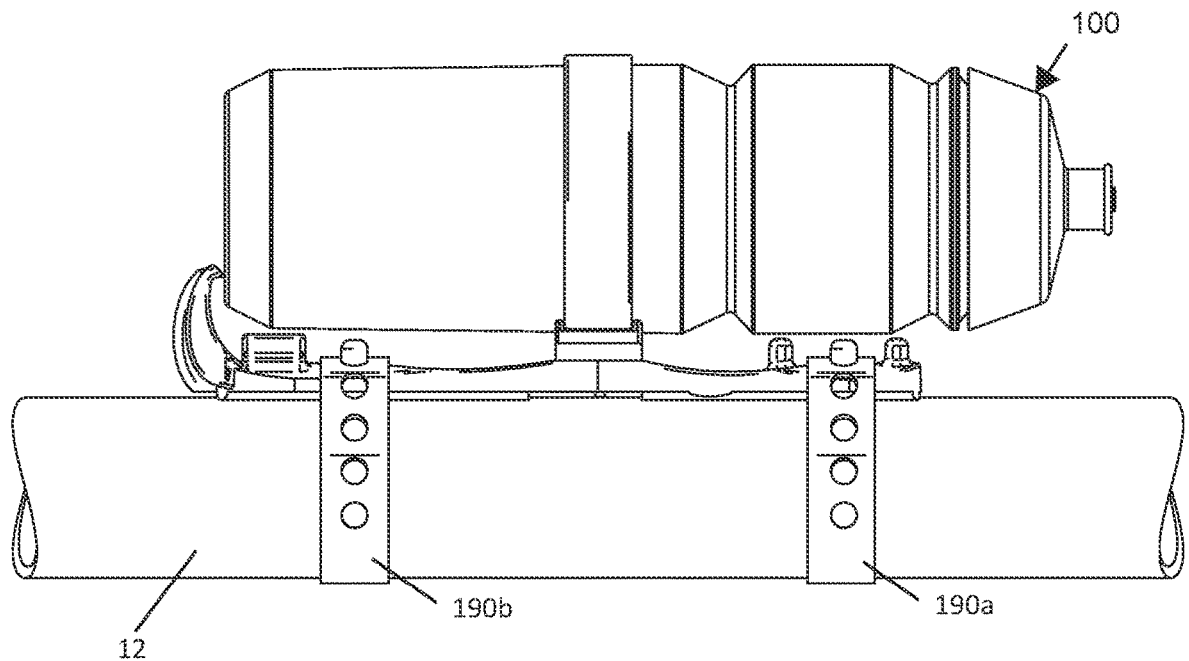

FIGS. 6 and 7 illustrate the use of first and second elastic straps 190a, 190b to attach the bottle holder 100 assembly to a downtube 12 of a bicycle frame. While many bicycles include threaded apertures on their down tube to attach a bottle cage to the bicycle, a number of bicycles lack this attachment feature. This is particularly true of higher end bicycles and those having carbon fiber frames. To allow connection of the bottle holder 100 to such bicycles, the bottle holder 100 may include the second attachment means mentioned above. As previously noted, the second means of attaching the assembly frame 122 a tube of a bicycle includes first and second strap apertures 128a, 128b located proximate to the forward and rearward ends of the frame. See also FIG. 3A. Straps 190a, 190b may pass through these apertures 128a, 128b, extend around the frame of a bicycle and engage corresponding studs 129a, 129b on the upper surface of the assembly frame 120. The straps 190a, 190b are elastic to allow for securing/cinching the straps around the bicycle tube of round, elliptical or irregular cross-section, securing the assembly frame 120 to the bicycle. Further, each of the straps 190a, 190b may include a plurality of apertures 194 spaced along their length. Each strap 190, may be inserted through its respective aperture 128 and pulled though the aperture until a thicker end 196 (See FIG. 7) prevents continued advancement of the strap 190 through the aperture 128. The bottle holder 100 may then be positioned on the tube 12 of the bike frame. Each strap 190 may then be wrapped around the tube 12 and stretched until one of the band apertures 194 is aligned with the stud 129 on the top surface of the bottle holder 100. The aperture 194 may be disposed over the stud 129 thereby securing the bottle holder 100 to the bicycle frame 100. This is also illustrated in FIG. 8B. FIG. 8A illustrates the use of the first and second apertures 126a and 126b in the frame 120 to connect the bottle holder 100 to a bicycle tube 12 utilizing first and second bolts 198.

All directional references (e.g., plus, minus, upper, lower, upward, downward, left, right, forward, rearward, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for," and similar phrases indicate that the subject device, apparatus, or system is designed and/or constructed (e.g., through appropriate hardware and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A magnetic water bottle holder for a bicycle, comprising:
   an elongated body extending from a rearward end to a forward end, wherein a long axis is defined between the forward end and rearward end;
   a docking mount attached to the body between the rearward end and the forward end, the docking mount having:
      a generally arcuate channel extending across the body substantially transverse to the long axis of the body; and
      at least a first magnet disposed proximate to a bottom surface of the arcuate channel;
   a generally cylindrical ring configured for disposition about a bottle, the ring including at least a second magnet disposed within a sidewall of the ring;
   wherein, when the second magnet magnetically connects to the first magnet, an outside surface of the ring engages at least a portion of the bottom surface of the arcuate channel and an inside surface of the ring is disposed above top edges of the arcuate channel over at least a portion of a length of the arcuate channel.

2. The bottle holder of claim 1, wherein the arcuate channel has an average channel depth between the top edges of the arcuate channel and bottom edges of the arcuate channel along the length of the arcuate channel.

3. The bottle holder of claim 2, wherein the ring has a ring thickness between an inside surface and an outside surface of the sidewall of the ring, wherein the ring thickness is greater than the average channel depth.

4. The bottle holder of claim 3, wherein the sidewall of the ring has a varying thickness about a periphery of the ring.

5. The bottle holder of claim 4, wherein the second magnet is disposed in the thickest portion of the sidewall.

6. The bottle holder of claim 1, wherein:
   the channel has a channel width between a forward channel wall and a rearward channel wall; and
   the ring has a ring width between a forward end of the ring and a rearward end of the ring, wherein the ring width is less than the channel width.

7. The bottle holder of claim 1, wherein the arcuate channel has an arc measure of less than 90° measured from a center of the ring and first and second ends of the arcuate channel, when the ring is disposed in the arcuate channel.

8. The bottle holder of claim 1, wherein the arcuate channel has an arc measure of less than 70° measured from a center of the ring and first and second ends of the arcuate channel, when the ring is disposed in the arcuate channel.

9. The bottle holder of claim 1, wherein the ring is elastically deformable.

10. The bottle holder of claim 1, further comprising:
    a bottle disposed within the ring, wherein the bottle is suspended free of contact with the docking mount when the ring is disposed in the arcuate channel.

11. The bottle holder of claim 1, further comprising:
    a projection disposed on the body proximate to the rearward end, the projection extending transverse to the long axis and configured to engage a bottom end of a bottle disposed in the ring, when the ring is disposed in the channel.

12. The bottle holder of claim 1, wherein the body has first and second apertures spaced along the length of the body for attaching the body to a bicycle.

13. The bottle holder of claim 1, further comprising first and second straps configured to engage the forward and rearward ends of the body for attaching the body to a bicycle.

14. A magnetic water bottle holder for a bicycle, comprising:
    an elongated body extending from a rearward end to a forward end, wherein a long axis is defined between the forward end and rearward end;
    a docking mount attached to the body between the rearward end and the forward end, the docking mount having:
       a channel extending across the body substantially transverse to the long axis of the body, the channel having an average channel depth between a top edge of the channel and a bottom edge of the channel; and at least a first magnet disposed proximate to a bottom surface of the channel;

a generally cylindrical ring configured for disposition about a bottle, the ring having:

a ring thickness between an inside surface and an outside surface of a sidewall of the ring, wherein the ring thickness is greater than the average channel depth; and at least a second magnet disposed in a sidewall of the ring;

wherein when the second magnet magnetically connects to the first magnet, an outside surface of the ring engages at least a portion of the bottom surface of the channel and an inside surface of the ring is disposed above the top edge of the channel.

15. The bottle holder of claim 14, wherein the channel is a generally arcuate channel.

16. The bottle holder of claim 15, wherein the arcuate channel has an arc measure of less than 90° measured from a center of the ring and first and second ends of the arcuate channel, when the ring is disposed in the arcuate channel.

17. The bottle holder of claim 16, wherein the arcuate channel has an arc measure of less than 70° measured from a center of the ring and first and second ends of the arcuate channel, when the ring is disposed in the arcuate channel.

18. The bottle holder of claim 14, further comprising:

a bottle disposed within the ring, wherein the bottle is suspended free of contact with the docking mount when the ring is disposed in the channel.

19. A magnetic water bottle holder for a bicycle, comprising:

an elongated body extending from a rearward end to a forward end and defining a long axis between the forward and rearward end;

a docking mount attached to the body between the rearward end and the forward end, the docking mount having a channel extending across the body substantially transverse to the long axis of the body, the channel having:

a channel width between a forward channel wall and a rearward channel wall; and an average channel depth between top edges of the channel and bottom edges of the channel; and at least a first magnet disposed proximate to a bottom surface of the channel;

a generally cylindrical ring configured for disposition about a bottle, the ring having:

a ring width between forward and rearward ends of the ring, the ring width being less than the channel width; and a ring thickness between an inside surface and an outside surface of the ring, wherein the ring thickness is greater than the average channel depth; and at least a second magnet disposed in a sidewall of the ring;

wherein when the second magnet magnetically connects to the first magnet an outside surface of the ring engages at least a portion of the bottom surface of the channel and an inside surface of the ring is disposed above the top edge of the channel.

* * * * *